United States Patent
Petersson et al.

(10) Patent No.: US 11,056,785 B2
(45) Date of Patent: *Jul. 6, 2021

(54) BEAMFORMING USING AN ANTENNA ARRAY

(71) Applicant: Telefonaktiebolaget LM Ericsson (publ), Stockholm (SE)

(72) Inventors: Sven Petersson, Sävedalen (SE); Fredrik Athley, Kullavik (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,545

(22) Filed: Feb. 27, 2020

(65) Prior Publication Data

US 2020/0212567 A1 Jul. 2, 2020

Related U.S. Application Data

(63) Continuation of application No. 15/548,464, filed as application No. PCT/EP2016/054622 on Mar. 4, 2016, now Pat. No. 10,581,165.

(30) Foreign Application Priority Data

Mar. 6, 2015 (WO) .................. PCT/EP2015/054783

(51) Int. Cl.
*H04B 7/06* (2006.01)
*H01Q 3/40* (2006.01)
(Continued)

(52) U.S. Cl.
CPC ............... *H01Q 3/40* (2013.01); *H01Q 1/246* (2013.01); *H01Q 21/0025* (2013.01);
(Continued)

(58) Field of Classification Search
CPC ...... H04B 7/0617; H04B 7/0691; H04B 7/10; H01Q 1/246; H01Q 3/40; H01Q 21/0025
(Continued)

(56) References Cited

U.S. PATENT DOCUMENTS 6,218,987 B1 4/2001 Derneryd et al.
7,027,839 B2 4/2006 Umesh et al.
(Continued)

FOREIGN PATENT DOCUMENTS

CN 1261989 A 8/2000
CN 101356747 A 1/2009
(Continued)

OTHER PUBLICATIONS

Kokshoorn, M. et al. "Fast Channel Estimation for Millimetre Wave Wireless Systems Using Overlapped Beam Patterns", IEEE ICC 2015 SAC—Millimeter-wave Communications, Jun. 8, 2015, pp. 1304-1309, IEEE.
(Continued)

*Primary Examiner* — Emmanuel Bayard
(74) *Attorney, Agent, or Firm* — Coats & Bennett, PLLC

(57) ABSTRACT

There is provided mechanisms for transmitting a signal using a beamforming antenna array. A method being is by a network node. The method comprises obtaining an indication for transmission of the signal requiring use of a partial antenna array of the antenna array, the partial antenna array requiring less than all of the physical elements of the antenna array for transmission. The method comprises forming virtual antenna elements for the partial antenna array, thereby reducing the full antenna aperture of the antenna array. The method comprises expanding weight factors applied to the virtual antenna elements by connecting each of the virtual antenna elements to at least part of all physical antenna elements of the antenna array such that the virtual antenna
(Continued)

elements at least partly utilize the full antenna aperture. The method comprises initiating transmission of the signal using the array of the virtual antenna elements.

25 Claims, 6 Drawing Sheets

(51) Int. Cl.
 H04B 7/10 (2017.01)
 H01Q 1/24 (2006.01)
 H01Q 21/00 (2006.01)
(52) U.S. Cl.
 CPC ......... *H04B 7/0617* (2013.01); *H04B 7/0691* (2013.01); *H04B 7/10* (2013.01)
(58) Field of Classification Search
 USPC ........................................ 375/267, 295, 299
 See application file for complete search history.

(56) References Cited

U.S. PATENT DOCUMENTS

| | | | |
|---|---|---|---|
| 7,062,002 B1 | 6/2006 | Michel et al. | |
| 8,774,079 B2 | 7/2014 | Proctor, Jr. et al. | |
| 8,994,588 B2 | 3/2015 | Petersson et al. | |
| 9,059,760 B2 | 6/2015 | Jiang | |
| 9,509,387 B2 | 11/2016 | Athley | |
| 9,960,828 B2 | 5/2018 | Petersson | |
| 10,014,923 B2 | 7/2018 | Molnar | |
| 10,581,165 B2* | 3/2020 | Petersson | H01Q 1/246 |
| 2005/0157805 A1 | 7/2005 | Walton et al. | |
| 2006/0008021 A1* | 1/2006 | Bonnet | H04L 1/0618 |
| | | | 375/267 |
| 2007/0135161 A1 | 6/2007 | Molnar | |
| 2008/0187066 A1 | 8/2008 | Wang | |
| 2009/0010356 A1 | 1/2009 | Engstrom et al. | |
| 2009/0033556 A1 | 2/2009 | Stickley et al. | |
| 2009/0066595 A1 | 3/2009 | Barker | |
| 2009/0080560 A1 | 3/2009 | Na | |
| 2009/0190681 A1* | 7/2009 | Moulsley | H04L 27/2649 |
| | | | 375/260 |
| 2010/0104036 A1 | 4/2010 | Liao | |
| 2010/0158331 A1 | 6/2010 | Jacobs | |
| 2010/0189047 A1* | 7/2010 | Baum | H04B 17/318 |
| | | | 370/329 |
| 2010/0310009 A1 | 12/2010 | Lakkis | |
| 2010/0316154 A1 | 12/2010 | Park | |
| 2011/0019759 A1 | 1/2011 | Stager et al. | |
| 2011/0199992 A1 | 8/2011 | Barker et al. | |
| 2011/0212730 A1 | 9/2011 | Wennstrom et al. | |
| 2011/0216845 A1 | 9/2011 | Nakao | |
| 2012/0027111 A1 | 2/2012 | Vook | |
| 2012/0274514 A1 | 11/2012 | Petersson | |
| 2012/0287981 A1 | 11/2012 | Xiao et al. | |
| 2012/0319920 A1 | 12/2012 | Athley | |
| 2013/0044650 A1 | 2/2013 | Barker et al. | |
| 2013/0120191 A1 | 5/2013 | Zhang | |
| 2013/0121276 A1 | 5/2013 | Kim et al. | |
| 2014/0071792 A1 | 3/2014 | Yoo | |
| 2014/0285373 A1 | 9/2014 | Kuwahara | |
| 2014/0362946 A1 | 12/2014 | Kakishima | |
| 2015/0010106 A1 | 1/2015 | Skov | |
| 2015/0326289 A1 | 11/2015 | Kim | |
| 2015/0333884 A1 | 11/2015 | Athley | |
| 2016/0021551 A1 | 1/2016 | Park | |
| 2016/0065290 A1 | 3/2016 | Zhu | |
| 2016/0149680 A1 | 5/2016 | Kang | |
| 2016/0377713 A1 | 12/2016 | Kamo | |
| 2017/0041113 A1 | 2/2017 | Park et al. | |
| 2017/0310376 A1 | 10/2017 | Jarmyr | |

FOREIGN PATENT DOCUMENTS

| | | |
|---|---|---|
| CN | 102404035 A | 4/2012 |
| CN | 102640352 A | 8/2012 |
| CN | 102752035 A | 10/2012 |
| CN | 103891152 A | 6/2014 |
| EP | 1764867 B1 | 7/2008 |
| EP | 2680471 A1 | 1/2014 |
| RU | 2374724 C1 | 11/2009 |
| RU | 2009119753 A | 12/2010 |
| WO | 9933212 A1 | 7/1999 |
| WO | 0054424 A2 | 9/2000 |
| WO | 0062436 A1 | 10/2000 |
| WO | 2007082408 A1 | 7/2007 |
| WO | 2011050866 A1 | 5/2011 |
| WO | 2014206443 A1 | 12/2014 |
| WO | 2015081999 A1 | 6/2015 |
| WO | 2016102010 A1 | 6/2016 |
| WO | 2017190777 A1 | 11/2017 |
| WO | 2017190811 A1 | 11/2017 |

OTHER PUBLICATIONS

Rappaport, T. et al., "State of the Art in 60-GHz Integrated Circuits and Systems for Wireless Communications", Proceedings of the IEEE, Aug. 2011, pp. 1390-1436, vol. 99, No. 8.

Ericsson, "Precoding Codebook Design for Four branch MIMO System", 3GPP TSG-RAN WG1 #68bis, Jeju, South Korea, Mar. 26, 2012, pp. 1-14, R1-121761, 3GPP.

Dueck, G., "New Optimization Heuristics. The Great Deluge Algorithm and the Record-t0-Record Travel", Journal of Computational Physics, vol. 104, Issue 1, Jan. 1, 1993, pp. 86-92.

\* cited by examiner

BEAMFORMING USING AN ANTENNA ARRAY

RELATED APPLICATIONS

This application is a continuation of prior application Ser. No. 15/548,464, filed 3 Aug. 2017, which was the National Stage of International Application PCT/EP2016/054622 filed 4 Mar. 2016, which claims priority to PCT/EP2015/054783 filed 6 Mar. 2015, the entire disclosure of each being hereby incorporated by reference herein.

TECHNICAL FIELD

Embodiments presented herein relate to a method, a network node, a computer program, and a computer program product for transmitting a signal using a beamforming antenna array.

BACKGROUND

In communications networks, there may be a challenge to obtain good performance and capacity for a given communications protocol, its parameters and the physical environment in which the communications network is deployed.

One component of wireless communications networks where it may be challenging to obtain good performance and capacity is the antennas of network nodes configured for wireless communications; either to/from another network node, and/or to/from a wireless user terminal.

For example, massive beamforming, i.e., beamforming using active antenna arrays with orders of magnitudes more antenna elements than used in current communications networks, is expected to become a technical component in the radio access part of future fifth generation (5G) communications networks. By using large antenna arrays at the radio base stations, user data can be transmitted focused in space so that energy is received mainly by the wireless device dedicated by the user data, thus resulting in little interference being perceived by other wireless devices or other types of nodes. Massive beamforming has therefore the potential to increase system capacity and energy efficiency by orders of magnitudes.

As carrier frequency increases it is foreseen that the number of radio chains in the active antenna arrays can be comparatively large, possibly several hundreds. This type of large antenna arrays is suitable for analog beamforming networks since it does not need any attenuators. This type of large antenna arrays is also suitable for user specific beamforming by creating narrow transmission beams in directions where the radio channel is strong towards a user. However, when signals are to be transmitted over a larger area, for example control plane transmission, the antenna arrays are not that suitable if conventional techniques are used to form the wider transmission beams. The conventional technique is to apply amplitude taper which results in many power amplifiers in the radio chains being more or less not used and, as a consequence, the total output power is reduced.

Hence, there is still a need for improved beamforming mechanisms.

SUMMARY

An object of embodiments herein is to provide efficient beamforming mechanisms.

According to a first aspect there is presented a method for transmitting a signal using a beamforming antenna array. The method is performed by a network node. The method comprises obtaining an indication for transmission of the signal requiring use of a partial antenna array of the antenna array, the partial antenna array requiring less than all of the physical elements of the antenna array for transmission. The method comprises forming virtual antenna elements for the partial antenna array, thereby reducing the full antenna aperture of the antenna array. The method comprises expanding weight factors applied to the virtual antenna elements by connecting each of the virtual antenna elements to at least part of all physical antenna elements of the antenna array such that the virtual antenna elements at least partly utilize the full antenna aperture. The method comprises initiating transmission of the signal using the array of the virtual antenna elements.

Advantageously this method provides efficient beamforming of the signal to be transmitted using the antenna array.

Advantageously this methods enables an efficient antenna architecture to be used for transmitting a signal with an adjustable beam width.

The beam width can be very wide compared to the beam width corresponding to the full antenna array size, even as wide as for a single antenna element.

All power amplifiers of the antenna array can be fully utilized, i.e. with only phase taper applied.

Advantageously, this method enables a desired number of antenna ports to be defined, the number of antenna ports being less than, or equal to, the number of physical antenna elements of the antenna array.

The antenna architecture can be based on either linear (1-D) or planar (2-D) antenna arrays.

According to a second aspect there is presented a network node for transmitting a signal using a beamforming antenna array. The network node comprises processing circuitry. The processing circuitry is configured to cause the network node to obtain an indication for transmission of the signal requiring use of a partial antenna array of the antenna array, the partial antenna array requiring less than all of the physical elements of the antenna array for transmission. The processing circuitry is configured to cause the network node to form virtual antenna elements for the partial antenna array, thereby reducing the full antenna aperture of the antenna array. The processing circuitry is configured to cause the network node to expand weight factors applied to the virtual antenna elements by connecting each of the virtual antenna elements to at least part of all physical antenna elements of the antenna array such that the virtual antenna elements at least partly utilize the full antenna aperture. The processing circuitry is configured to cause the network node to initiate transmission of the signal using the array of the virtual antenna elements.

According to a third aspect there is presented a network node for transmitting a signal using a beamforming antenna array. The network node comprises processing circuitry and a computer program product. Computer program product stores instructions that, when executed by the processing circuitry, causes the network node to perform operations, or steps. The operations, or steps, cause the network node to obtain an indication for transmission of the signal requiring use of a partial antenna array of the antenna array, the partial antenna array requiring less than all of the physical elements of the antenna array for transmission. The operations, or steps, cause the network node to form virtual antenna elements for the partial antenna array, thereby reducing the full antenna aperture of the antenna array. The operations, or steps, cause the network node to expand weight factors applied to the virtual antenna elements by connecting each of the virtual antenna elements to at least part of all physical antenna elements of the antenna array such that the virtual antenna elements at least partly utilize the full antenna aperture. The operations, or steps, cause the network node to initiate transmission of the signal using the array of the virtual antenna elements.

According to a fourth aspect there is presented network node for transmitting a signal using a beamforming antenna array. The network node comprises an obtain module configured to obtain an indication for transmission of the signal requiring use of a partial antenna array of the antenna array, the partial antenna array requiring less than all of the physical elements of the antenna array for transmission. The network node comprises a form module (101b) configured to form virtual antenna elements for the partial antenna array, thereby reducing the full antenna aperture of the antenna array. The network node comprises an expand module configured to expand weight factors applied to the virtual antenna elements by connecting each of the virtual antenna elements to at least part of all physical antenna elements of the antenna array such that the virtual antenna elements at least partly utilize the full antenna aperture. The network node comprises an initiate module configured to initiate transmission of the signal using the array of the virtual antenna elements.

According to a fifth aspect there is presented a computer program for transmitting a signal using a beamforming antenna array, the computer program comprising computer program code which, when run on a network node, causes the network node to perform a method according to the first aspect.

According to a sixth aspect there is presented a computer program product comprising a computer program according to the fifth aspect and a computer readable storage medium on which the computer program is stored.

It is to be noted that any feature of the first, second, third, fourth, fifth and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The herein proposed antenna array and method offers both beam patterns with desired beam shapes, as well as excellent power utilization. The embodiments disclosed herein particularly relate to transmitting a signal using a beamforming antenna array. In order to obtain such transmitting there is provided a network node, a method performed by the network node, a computer program product comprising code, for example in the form of a computer program, that when run on a network node, causes the network node to perform the method.

Figure 1:
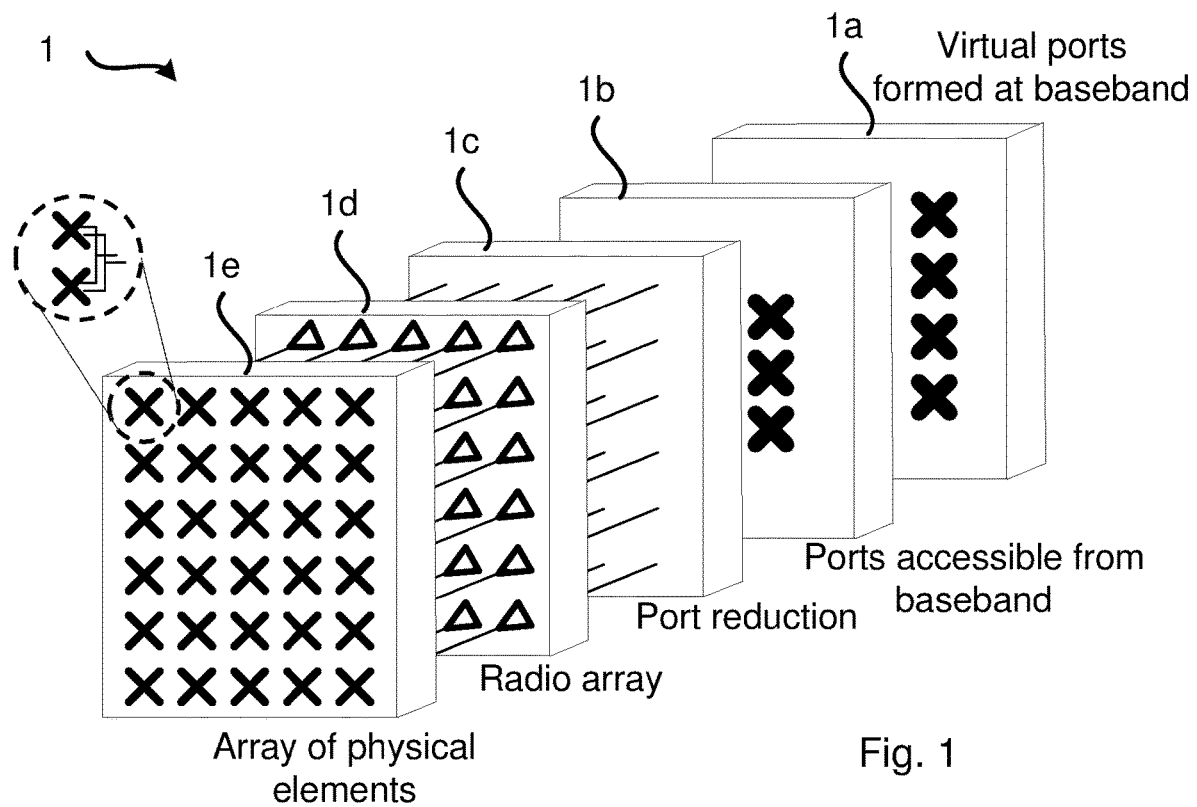
FIGS. 1, 2, 3, 4, 5, and 6 are schematic diagrams illustrating different aspects of antenna arrays according to embodiments.

FIG. 1 is a schematic block diagram illustrating an example architecture of a two dimensional antenna array 1 for which embodiments presented herein can be applied. However, the embodiments presented herein are equally applicable to one-dimensional antenna arrays. The antenna array 1 can thus either be a linear array (1-D), a uniform linear array (ULA), or planar array (2-D), uniform rectangular array (URA).

The antenna front end comprises a physical array 1e comprising antenna elements where each antenna element may be a sub-array of several radiating antenna elements connected via feed networks to two subarray ports having orthogonal polarization. Each subarray port is connected to a radio chain as comprised in a radio array 1d. The number of subarray ports in block 1b accessible to baseband signal processing may be reduced via a port reduction block 1c that creates new antenna ports that are (linear) combinations of the input antenna ports. Access is made to the subarray ports at baseband if both dedicated and broadcasted data is to be transmitted at the same time. Further, in general terms, access to all subarray ports may be needed for shaping wide beams according to the herein disclosed mechanisms for beamforming. In the baseband signal processing block 1a virtual antenna ports may be created by matrix multiplications. These virtual antenna ports may be of different type. For example, in Long Term Evolution (LTE) radio access systems they may for a radio base station carry common reference signals (CRS) at ports 0-3, channel state information reference signals (CSI-RS) at port 15-22, and user-specific reference signals and data at ports 7-14. In some implementations one or several blocks of the in the two dimensional antenna array 1 in FIG. 1 may be removed.

Figure 2:
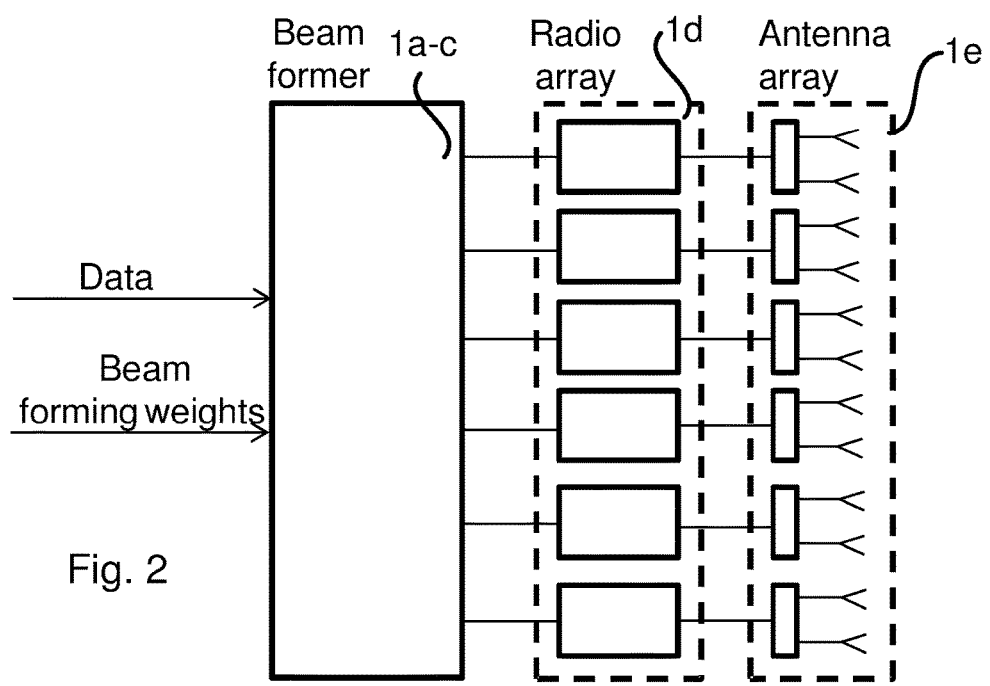

FIG. 2 is a schematic block diagram illustrating a possible implementation of the two dimensional antenna array 1 of FIG. 1. It comprises a beam former comprising blocks 1a, 1b, 1c of FIG. 1, a radio array 1d and a physical antenna array 1e. In the example of FIG. 2 there are two antenna ports per subarray. The beam former 1a-c is configured to receive user data and control data, beamforming weights for the user data, beamforming weights for reference signals, such as CSI-RS and beamforming weights for wide beam transmission.

Figure 3:
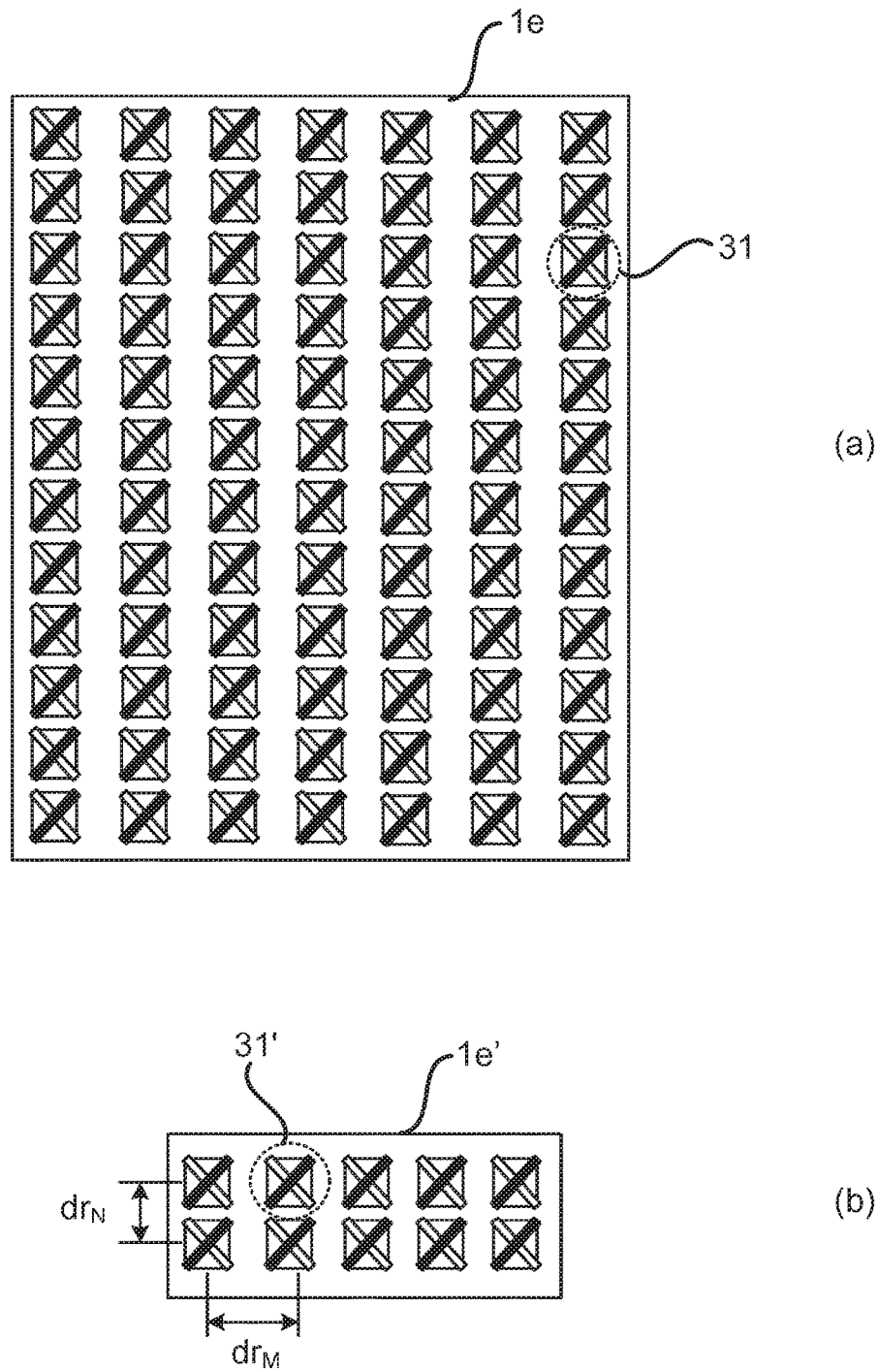

FIG. 3 at (a) schematically illustrates a physical antenna array 1e of an antenna array 1 of size ($N_x \times M_x$) comprising physical antenna elements, one of which is identified at reference numeral 31. FIG. 3 at (b) schematically illustrates a virtual antenna array 1e' comprising of size ($N_z \times M_z$) and virtual antenna elements, one of which is identified at reference numeral 31', where the virtual antenna elements are separated a distance $dr_M$ in dimension M and a distance $dr_N$ in dimension N. In this respect, the virtual antenna array can be regarded as a subset of the antenna array 1 with respect to power patterns, but not polarizations, for the antenna elements; the antenna elements of the physical antenna array 1e have the same power patterns. Each antenna element of the virtual antenna array is mapped to a multitude of antenna elements in the physical antenna array 1e. Embodiments of how to implement this mapping will be disclosed below.

Figure 4:
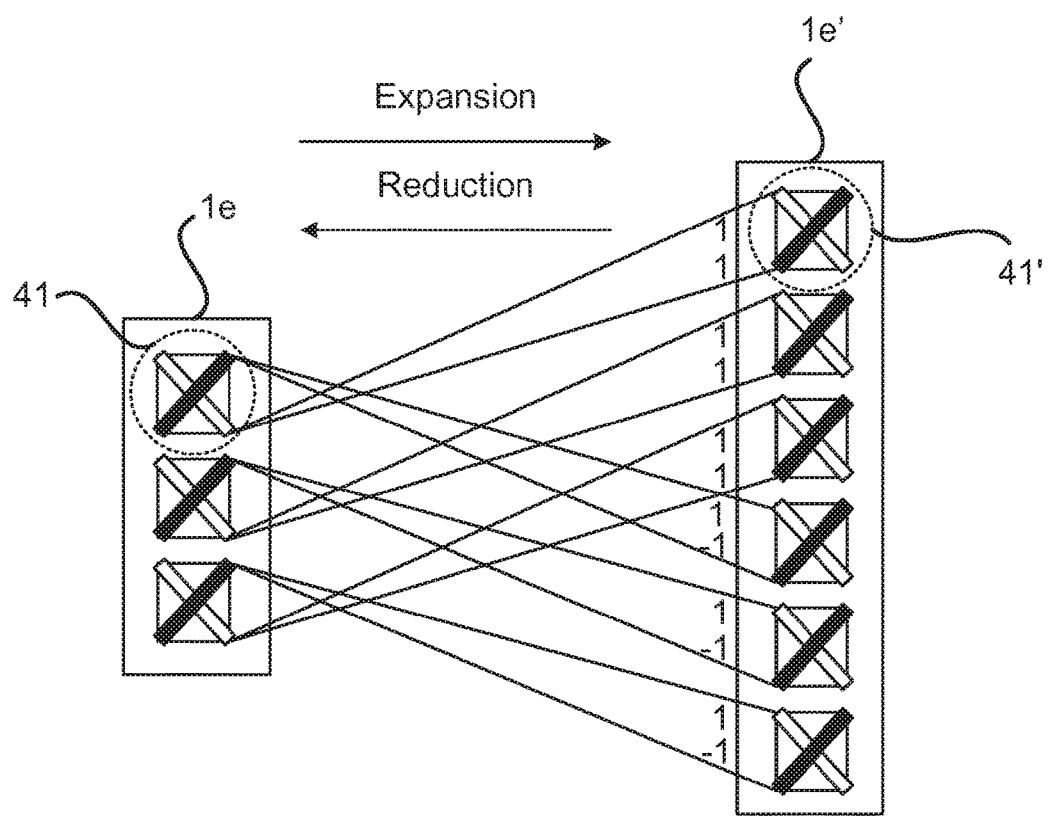

FIG. 4 schematically illustrates reduction (from right to left) and expansion (from left to right) a factor 2 via weight factors for antenna elements, two of which are identified at reference numerals 41, 41', in two physical antenna arrays 1e, 1e'. According to the illustrative example of FIG. 4, each weight factor takes only a value in the set defined by the values $\{-1,+1\}$. Thus, the antenna elements 41 of the physical antenna array 1e can be expanded to the antenna elements 41' of the physical antenna array 1e' and the antenna elements 41' of the physical antenna array 1e' can be reduced to the antenna elements 41 of the physical antenna arrays 1e. Embodiments for how to perform such an expansion and such a reduction will be disclosed below under aperture reduction and aperture expansion, respectively.

Figure 5:
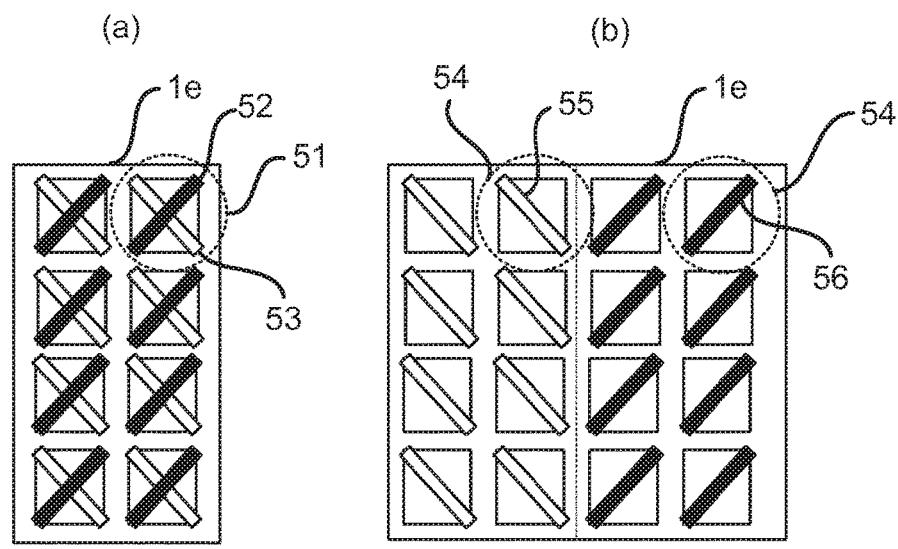

FIG. 5 schematically illustrates two embodiments of a physical antenna array 1e. Each physical antenna array 1e comprises antenna elements 51, 54, where each antenna element comprises two sub-elements 52, 53, 55, 56 having orthogonal polarizations in all directions (of interest). In FIG. 5(a) the two sub-elements 52, 53 are located at the same position, and in FIG. 5(b) the two sub-elements 55, 56 are displaced in relation to each other, but still considered to be part of the same antenna element 54. Sub-elements part of the same antenna element form a sub-element pair. In FIG. 5(5) the sub-elements 55 and 56 thus form a sub-element pair. In relation thereto, the displacement is the same for all sub-element pairs.

Figure 6:
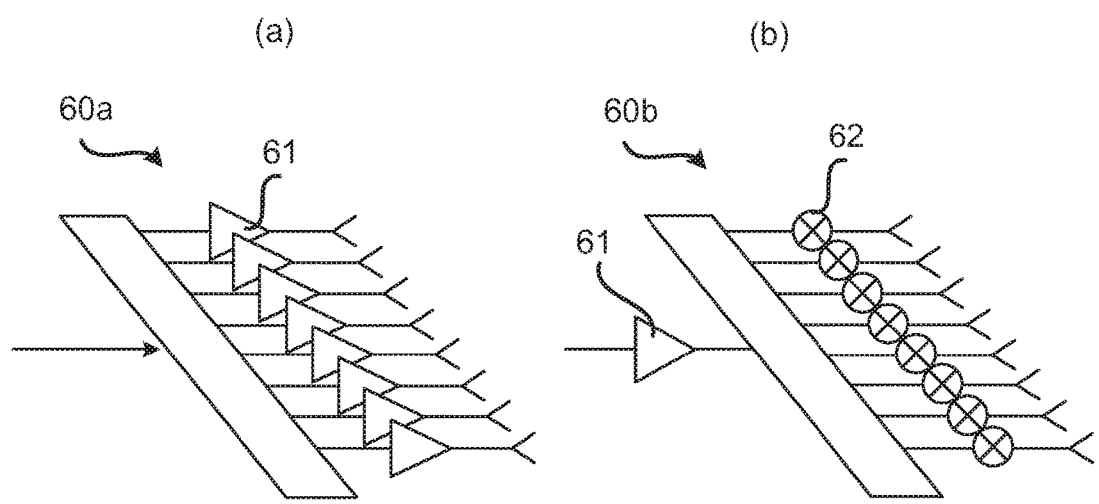

One reason for using all antenna elements in the antenna array, as well as for the subarray port mapping, and thus beam port mapping, to have uniform amplitude, is to efficiently use the available power resource. This applies specifically for an active antenna array with distributed power amplifiers but it also applies for an antenna array with a power distribution network 60a, 60b comprising phase shifters 62, possibly also attenuators 61 as in FIGS. 6(a) and 6(b).

Figure 7:
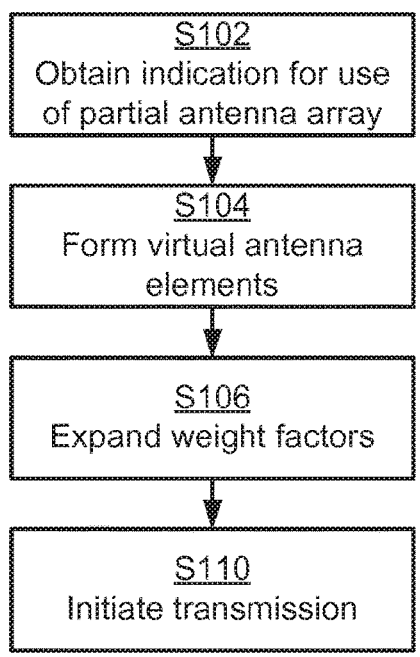
FIGS. 7 and 8 are flowcharts of methods according to embodiments.
Figure 8:
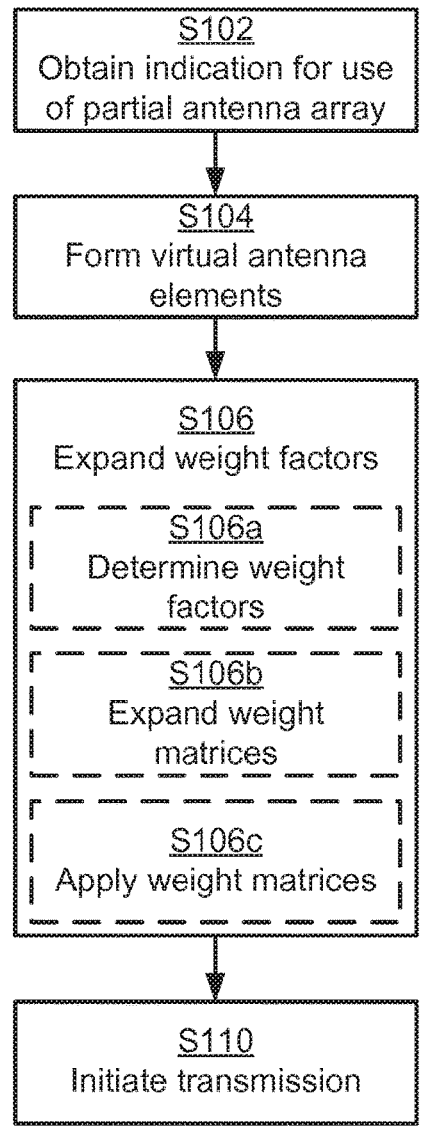

FIGS. 7 and 8 are flow chart illustrating embodiments of methods for transmitting a signal using a beamforming antenna array 1. The methods are performed by the network node 100. The methods are advantageously provided as computer programs 320.

Reference is now made to FIG. 7 illustrating a method for transmitting a signal using a beamforming antenna array 1 as performed by the network node 100 according to an embodiment.

The method for transmitting a signal using a beamforming antenna array 1 is based on starting from the full aperture of the antenna array 1 and combining the physical antenna elements of the antenna array 1 to form new virtual antenna elements.

S102: The network node 100 obtains an indication for transmission of the signal. The transmission of the signal requires use of a partial antenna array of the antenna array. The partial antenna array requires less than all of the physical elements of the antenna array for transmission. In other words, the partial antenna array requires use of less than all of the physical elements of the antenna array for transmission of the signal.

The method for transmitting a signal using a beamforming antenna array 1 is based on starting from the full aperture of the antenna array 1 and combining the physical antenna elements of the antenna array 1 to form new virtual antenna elements, as in steps S104, S106:

S104: The network node 100 forms virtual antenna elements for the partial antenna array. The full antenna aperture of the antenna array is thereby reduced.

The virtual antenna elements have the same power pattern as the physical antenna elements but the power resource is much higher (actually the sum of the power resource for all antenna elements being combined). The network node 100 thus expands the virtual antenna elements to at least partly utilize the full antenna aperture, as in step S106:

S106: The network node 100 expands weight factors applied to the virtual antenna elements. The weight factors are expanded by the network node 100 connecting each of the virtual antenna elements to at least part of all physical antenna elements of the antenna array such that the virtual antenna elements at least partly utilize the full antenna aperture.

The combination of virtual antenna elements is repeated until the resulting number of virtual antenna elements, i.e., the virtual aperture, is as desired. Transmission of the signal is then initiated, as in step S108:

S108: The network node 100 initiates transmission of the signal using the array of the virtual antenna elements.

A feed network is thereby defined such that the physical antenna array X of dual polarized antenna elements of size ($N_x \times M_x$) is reduced to a virtual antenna array, Z, comprising ($N_z \times M_z$) virtual antenna elements. The feed network can be expressed in terms of weight factors in weighting matrices. The elements in this virtual antenna array Z can be combined to form one or more beam ports.

According to some embodiments the angular power pattern of the virtual antenna elements is identical to the angular power pattern of one of the physical antenna elements of the antenna array. Some properties of the feed network are such that the angular power spectrum for the full physical aperture of the physical antenna array X is identical to the power spectra of the antenna aperture defined by the virtual antenna array, Z. Hence, according to embodiments the weight factors are expanded such that the virtual antenna elements utilize the full antenna aperture. Further, the virtual antenna elements have a total power being the sum of output power for all physical antenna elements of the antenna array.

According to some embodiments the indication is for a needed beam for transmission of the signal. The needed beam requires less than all of the physical elements of the antenna array for transmission. For example, the needed beam could be defined by a needed beam width or a needed number of antenna ports for transmission of the signal using the antenna array 1. In other words, by means of the network node 100 performing steps S102-S108 it is possible to transmit the signal in a transmission beam where the transmission beam utilizes a low number of virtual antenna elements, typically meaning large beam widths, via the large full physical aperture, X, and still get the same angular power spectra, i.e. beam shape. This enables all power amplifiers in an active antenna array to be used, regardless of beam width.

Embodiments relating to further details of transmitting a signal using a beamforming antenna array 1 will now be disclosed.

Reference is now made to FIG. 8 illustrating methods for transmitting a signal using a beamforming antenna array 1 as performed by the network node 100 according to further embodiments. Steps S102-S108 are performed as disclosed with reference to FIG. 7 and a repetition of these steps is therefore omitted.

Aperture Reduction

Operations of converting the physical antenna array X to the virtual antenna array Z define embodiments of how the virtual antenna elements can be formed in step S104 and will now be described as a two-step process. In a first reduction step the full aperture of the antenna array 1 is reduced along a first dimension, which in this description is selected as the first, or the "M", dimension.

The physical antenna array X can be regarded as a matrix describing the excitation in the aperture of the antenna elements with polarization A, $X_A$, and polarization B, $X_B$, respectively:

$$X = \begin{bmatrix} X_A \\ X_B \end{bmatrix}, X \in C^{2N_x \times M_x}$$

The first step of converting the physical antenna array X to the virtual antenna array Z comprises determining a matrix $\tilde{Y}$ as follows:

$$\tilde{Y} = \begin{bmatrix} \tilde{Y}_A \\ \tilde{Y}_B \end{bmatrix} = Q^H \begin{bmatrix} X_A^T \\ X_B^T \end{bmatrix}$$

Here, Q is a matrix describing the reduction of elements as follows:

$$Q = [Q_{2A} Q_{2B}], \text{ where } Q_{2A} \text{ and } Q_{2B} \in C^{2M_x \times M_z}$$

In other words, according to embodiments, Q comprises a first factor $Q_{2A}$ for reduction along a first dimension and resulting in a first polarization of the virtual antenna elements and a second factor $Q_{2B}$ for reduction along a first dimension and resulting in a second polarization of the virtual antenna elements.

Further, Y is a matrix describing the excitation of a first virtual antenna array and is found from $\tilde{Y}$ as follows:

$$Y = \begin{bmatrix} Y_A \\ Y_B \end{bmatrix} = \begin{bmatrix} \tilde{Y}_A^T \\ \tilde{Y}_B^T \end{bmatrix}, Y \in C^{2N_x \times M_z}$$

The reduction along the "N"-dimension takes place in a second reduction step resulting in a virtual aperture Z as follows:

$$Z = R^H Y = R^H \begin{bmatrix} Y_A \\ Y_B \end{bmatrix}$$

Here, R is a matrix describing the reduction of elements.

Hence, according to embodiments the virtual antenna elements are formed by reduction factors Q and R being applied to all antenna elements of the antenna array 1.

Two matrixes $R_{2A}$ (for 2A to be read as to-A, i.e. transformation to an element with polarization A) and $R_{2B}$ (for 2B to be read as to-B, i.e. transformation to an element with polarization B) are defined as follows:

$$R = [R_{2A} R_{2B}], \text{ where } R_{2A} \text{ and } R_{2B} \in C^{2N_x \times N_z}$$

In other words, according to embodiments R comprises a first factor $R_{2A}$ for reduction along the second dimension and resulting in the first polarization of the virtual antenna elements and a second factor $R_{2B}$ for reduction along the second dimension and resulting in the second polarization of the virtual antenna elements.

How to determine the reduction matrices Q and R to achieve identical power spectra (or power patterns) when transmitting over the antenna aperture Z and the antenna aperture X will be disclosed below. Examples of such matrices Q and R resulting in a reduction of the full aperture with a factor of 2, 6 and 10 will now be disclosed.

Reduction Factor 2

A vector $u_2^T$ is defined as:

$$u_2^T = [u_{2A}^T u_{2B}^T], \text{ where } u_{2A}^T \text{ and } u_{2B} \in C^{2 \times 1}$$

Vectors $u_{2A}^T$ and $u_{2B}^T$ are defined as follows:

$$u_{2A}^T = [e^{i\delta_1} 0]/\sqrt{2}$$

$$u_{2B}^T = [e^{i\delta_2} 0]/\sqrt{2}$$

Here, $\delta_1$ and $\delta_2$ denote phase angles and can be chosen arbitrarily.

A vector $v_2$ is derived from vectors $u_{2A}$ and $u_{2B}$ in the following way to ensure identical power pattern and orthogonal polarization:

$$v_2^T = e^{i\delta_3} [u_{2B}^T F - u_{2A}^T F]^*$$

Here, F is a matrix that reverses the order of the elements in the vector it operates on and [ ]* denotes complex conjugate of the element it operates on. Further, $\delta_3$ denotes a phase angle and can be chosen arbitrarily. Hence, according to embodiments the elements of $Q_{2B}$ are derived from $Q_{2A}$ by reversing in order, negating, and/or complex conjugating the elements of $Q_{2A}$. Similarly, the elements of $R_{2B}$ are derived from $R_{2A}$ by reversing in order, negating, and/or complex conjugating the elements of $R_{2A}$.

The two matrices $R_{2A}$ and $R_{2B}$ are determined as follows:

$$R_{2A} = u_2 \otimes I_{N_x/r} \text{ and } R_{2B} = v_2 \otimes I_{N_x/r}$$

Here, "$\otimes$" denotes the Kronecker product, $$I_{N_x/r}$$

denotes an identity matrix of size $N_x/r$, where $N_x$ is the dimension of the aperture at hand to be reduced, and r is the reduction factor (in this case r=2). The matrix Q is found in a similar way.

Some properties to consider when determining the matrices $R_{2A}$, $R_{2B}$, $Q_{2A}$ and $Q_{2B}$ will now be summarized.

The corresponding spatial power spectra are white. The elements with non-zero magnitude are subject to phase-only tapering. Hence, according to embodiments all non-zero elements of the reduction factors Q and R have constant modulus.

The matrices $R_{2A}$ and $R_{2B}$ result in virtual antenna ports with orthogonal polarization in all directions. The matrices $R_{2A}$ and $R_{2B}$ have the same reduction factor.

The matrices $Q_{2A}$ and $Q_{2B}$ result in virtual antenna ports with orthogonal polarization in all directions. The matrices $Q_{2A}$ and $Q_{2B}$ have the same reduction factor.

Given that the antenna array consists of antenna elements with orthogonal polarizations, so the same will apply also for the virtual array.

Hence, according to embodiments, the matrices matrices $Q_{2A}$ and $Q_{2B}$ have identical dimensions resulting in the same reduction, and the matrices $R_{2A}$ and $R_{2B}$ have identical dimensions resulting in same the reduction.

All elements in the reduced antenna array, with a given polarization, are the result from applying the same reduction matrices, except from a translation.

The separation between antenna elements (phase centers) in the reduced aperture is the same as for the non-reduced antenna array. Hence, according to embodiments the virtual antenna elements for each polarization have a phase center separation identical to the phase center separation of the full antenna aperture.

Reduction Factor 6

For a reduction factor of six, the vectors $u_6^T$, $u_{6A}^T$, and $u_{6B}^T$ are defined as follows:

$$u_6^T = [u_{6A}^T \; u_{6B}^T], \text{ where } u_{6A}^T \text{ and } u_{6B}^T \in C^{6\times 1}$$

and $$u_{6A}^T = e^{i\delta_1}\left[e^{i\frac{3\pi}{4}} \; e^{i0} \; e^{i\frac{\pi}{4}} \; 0 \; 0 \; 0\right]/\sqrt{6}$$

$$u_{6B}^T = e^{i\delta_2}\left[e^{i\frac{\pi}{4}} \; e^{i0} \; e^{i\frac{3\pi}{4}} \; 0 \; 0 \; 0\right]/\sqrt{6}$$

The phase angles $\delta_1$ and $\delta_2$ can be arbitrarily chosen and a linear phaseshift can be applied over $u_{6A}^T$ and $u_{6B}^T$ as long as the linear phaseshift is the same for both vectors $u_{6A}^T$ and $u_{6B}^T$.

The vector $v_6$ can be derived from the vectors $u_{6A}$ and $u_{6B}$ in the following way to ensure identical power pattern and orthogonal polarization:

$$v_6^T = e^{i\delta_3}[u_{6B}^T F - u_{6A}^T F]^*$$

As above, F is a matrix that reverses the order of the elements in the vector it operates on and [ ]* denotes complex conjugate of the element it operates on. The phase angle $\delta_3$ can be chosen arbitrarily.

The two matrixes $R_{2A}$ and $R_{2B}$ are then determined as follows:

$$R_{2A} = u_6 \otimes I_{N_x/r} \text{ and } R_{2B} = v_6 \otimes I_{N_x/r}$$

As above, $I_{N_x}/r$ denotes an identity matrix of size $N_x/r$, where $N_x$ is the dimension of the aperture at hand to be reduced and r is the reduction factor (in this case r=6). Q is, as above, found in a similar way.

Reduction Factor 10

Yet another reduction factor is 10 for which the vectors $u_{10A}^T$ and $u_{10B}^T$ are defined as follows:

$$u_{10A}^T = e^{i\delta_1}\left[e^{-i\frac{2\pi}{4}} \; e^{-i\frac{\pi}{4}} \; e^{i0} \; e^{i\frac{3\pi}{4}} \; e^{i0} \; 0 \; 0 \; 0 \; 0 \; 0\right]/\sqrt{10}$$

$$u_{10B}^T = e^{i\delta_2}\left[e^{i0} \; e^{i\frac{3\pi}{4}} \; e^{i0} \; e^{-i\frac{\pi}{4}} \; e^{-i\frac{2\pi}{4}} \; 0 \; 0 \; 0 \; 0 \; 0\right]/\sqrt{10}$$

Derivation of $R_{2A}$ and $R_{2B}$ is performed as for reduction factor six disclosed above and not shown here.

Iterative Reduction

In case reduction factors two, six and ten are not sufficient, these reduction factors can be combined in any desired way. Let $R_{tot}$ define a total reduction matrix as follows:

$$R_{tot} = \prod_k R_k(N_k, r_k)$$

Here, $R(N_k, r_k)$ is reduction matrix for stage k and $r_k$ is the reduction for stage k. $N_k$ is found from the previous stage as $N_{k-1}/r_{k-1}$.

As an example, the sizes for the matrices $R_{tot}=R_1R_2R_3$ becomes $$\left(2N_1 \times \frac{2N_1}{r_1}\right)\left(\frac{2N_1}{r_1} \times \frac{2N_1}{r_1r_2}\right)\left(\frac{2N_1}{r_1r_2} \times \frac{2N_1}{r_1r_2r_3}\right) = \left(2N_1 \times \frac{2N_1}{r_1r_2r_3}\right).$$

As the skilled person understands, the matrix Q can be found in a similar way. Hence, according to embodiments the full antenna aperture of the antenna array 1 is iteratively reduced at least two times along at least one dimension of the antenna array 1.

Use of R and Q for Array Expansion

Next will be disclosed operations of how the matrices R and Q can used for enabling a large aperture of the antenna array to be used for transmission beams that only require a small aperture for transmission. These operations define embodiments of how the weight factors can be expanded in step S106. According to embodiments the network node 100 is configured to perform steps S106a-s106c in order to expand the partial antenna aperture.

S106a: The network node 100 determines the weight factors for a weight matrix $W_v$. A weight matrix (also denoted an excitation matrix)

$$W_v = \begin{bmatrix} W_{vA} \\ W_{vB} \end{bmatrix}$$

is thus obtained for the desired beam shape to be used for transmission of the signal. This matrix $W_v$ corresponds to the small virtual antenna aperture Z and is then expanded to a large aperture in a two-step procedure.

S106b: The network node 100 expands the weight matrix $W_v$ such that the virtual antenna elements at least partly utilize the full antenna aperture. According to embodiments the weight matrix $W_v$ is expanded using the matrices Q and R. This expansion will be described next.

The virtual antenna aperture is first expanded with matrix Q according to $$\begin{bmatrix} W_{vpA}^T \\ W_{vpB}^T \end{bmatrix} = Q \begin{bmatrix} W_{vA}^T \\ W_{vB}^T \end{bmatrix}$$

Elements in the resulting matrix $$\begin{bmatrix} W_{vpA}^T \\ W_{vpB}^T \end{bmatrix}$$

(expanded along one dimension) are rearranged as follows:

$$W_{vp} = \begin{bmatrix} W_{vpA} \\ W_{vpB} \end{bmatrix}$$

Finally the, virtual antenna aperture is expanded also in the orthogonal dimension to form the full aperture of the antenna array X as follows:

$$W_p = \begin{bmatrix} W_{pA} \\ W_{pB} \end{bmatrix} = RW_{vp}$$

S106c: The network node 100 applies the weight matrix to the virtual antenna elements.

Although at least some of the above disclosed embodiments relate to reduction and expansion being performed along two dimensions of the antenna array 1, the herein disclosed embodiments are equally applicable for reduction and expansion being performed along one dimension of the antenna array 1. However, alternatively, the herein disclosed reduction and expansion is indeed performed along both dimensions of the antenna array 1.

Figure 9:
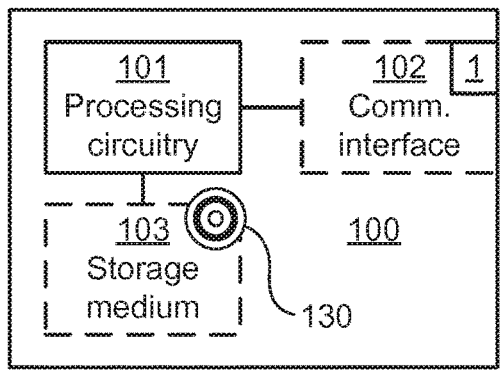
FIG. 9 is a block diagram showing functional units of a network node according to an embodiment.

FIG. 9 schematically illustrates, in terms of a number of functional units, the components of a network node 100 according to an embodiment. Processing circuitry 101 is provided using any combination of one or more of a suitable central processing unit (CPU), multiprocessor, microcontroller, digital signal processor (DSP), etc., capable of executing software instructions stored in a computer program product 130 (as in FIG. 13), e.g. in the form of a storage medium 103. The processing circuitry 101 may further be provided as at least one application specific integrated circuit (ASIC), or field programmable gate array (FPGA).

Particularly, the processing circuitry 101 is configured to cause the network node 100 to perform a set of operations, or steps, S102-S108, as disclosed above. For example, the storage medium 103 may store the set of operations, and the processing circuitry 101 may be configured to retrieve the set of operations from the storage medium 103 to cause the network node 100 to perform the set of operations. The set of operations may be provided as a set of executable instructions.

Thus the processing circuitry 101 is thereby arranged to execute methods as herein disclosed. The storage medium 103 may also comprise persistent storage, which, for example, can be any single one or combination of magnetic memory, optical memory, solid state memory or even remotely mounted memory. The network node 100 may further comprise a communications interface 102 comprising an antenna arrangement 1. The processing circuitry 101 controls the general operation of the network node 100 e.g. by sending data and control signals to the communications interface 102 and the storage medium 103, by receiving data and reports from the communications interface 102, and by retrieving data and instructions from the storage medium 103. Other components, as well as the related functionality, of the network node 100 are omitted in order not to obscure the concepts presented herein.

Figure 10:
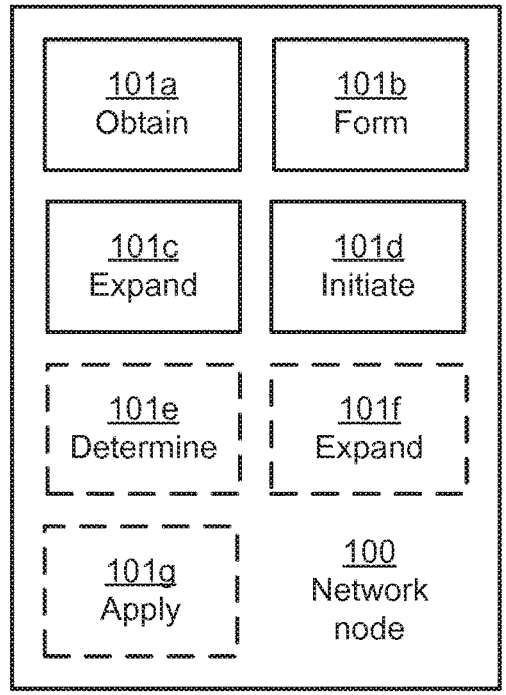
FIG. 10 is a block diagram showing functional modules of a network node according to an embodiment.

FIG. 10 schematically illustrates, in terms of a number of functional modules, the components of a network node 100 according to an embodiment. The network node 100 of FIG. 10 comprises a number of functional modules; an obtain module 101a configured to perform step S102, a form module 101b configured to perform step S104, an expand module 101c configured to perform step S106, and an initiate module 101d configured to perform step S108. The network node 100 of FIG. 10 may further comprises a number of optional functional modules, such as any of a determine module 101e configured to perform step S106a, an expand module 101f configured to perform step S106b, and an apply module 101g configured to perform step S106c.

In general terms, each functional module 101a-101g may in one embodiment be implemented only in hardware or and in another embodiment with the help of software, i.e., the latter embodiment having computer program instructions stored on the storage medium 103 which when run on the processing circuitry 101 makes the network node 100 perform the corresponding steps mentioned above in conjunction with FIGS. 7 and 8. It should also be mentioned that even though the modules 101a-101g correspond to parts of a computer program, they do not need to be separate modules therein, but the way in which they are implemented in software is dependent on the programming language used. Preferably, one or more or all functional modules 101a-101g may be implemented by the processing circuitry 101, possibly in cooperation with functional units 102 and/or 103. The processing circuitry 101 may thus be configured to from the storage medium 103 fetch instructions as provided by a functional module 101a-101g and to execute these instructions, thereby performing any steps as disclosed herein.

Figure 11:
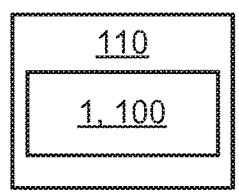
FIG. 11 schematically illustrates a radio access network node according to an embodiment.
Figure 12:
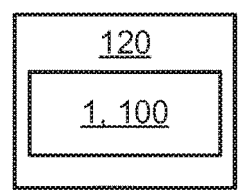
FIG. 12 schematically illustrates a wireless device according to embodiments.

The antenna array 1 and/or the network node 100 may be provided as integrated circuits, as standalone devices or as a part of a further device. For example, the antenna array 1 and/or network node 100 may be provided in a radio transceiver device, such as in a radio access network node 110 or a wireless device 120. FIG. 11 illustrates a radio access network node 110 comprising at least one antenna array 1 and/or network node 100 as herein disclosed. The radio access network node 110 may be a BTS, a NodeB, an eNB, a repeater, a backhaul node, or the like. FIG. 12 illustrates a wireless device 120 comprising at least one antenna array 1 and/or network node 100 as herein disclosed. The wireless device 120 may be a user equipment (UE), a mobile phone, a tablet computer, a laptop computer, etc. or the like.

The antenna array 1 and/or network node 100 may be provided as an integral part of the further device. That is, the components of the antenna array 1 and/or network node 100 may be integrated with other components of the further device; some components of the further device and the antenna array 1 and/or network node 100 may be shared. For example, if the further device as such comprises processing circuitry, this processing circuitry may be configured to perform the actions of the processing circuitry 101 of the network node 100. Alternatively the antenna array 1 and/or network node 100 are provided as separate units in the further device.

Figure 13:
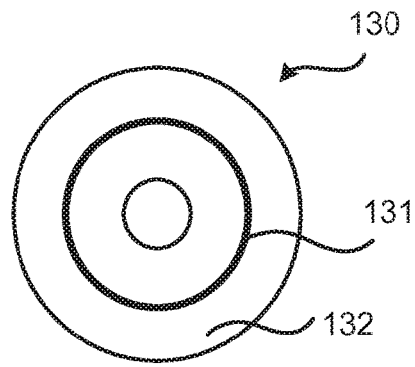
FIG. 13 schematically illustrates a computer program product according to an embodiment.

FIG. 13 shows one example of a computer program product 130 comprising computer readable storage medium 132. On this computer readable storage medium 132, a computer program 131 can be stored, which computer program 131 can cause the processing circuitry 101 and thereto operatively coupled entities and devices, such as the communications interface 102 and the storage medium 103, to execute methods according to embodiments described herein. The computer program 131 and/or computer program product 130 may thus provide means for performing any steps as herein disclosed.

In the example of FIG. 13, the computer program product 130 is illustrated as an optical disc, such as a CD (compact disc) or a DVD (digital versatile disc) or a Blu-Ray disc. The computer program product 130 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 131 is here schematically shown as a track on the depicted optical disk, the computer program 131 can be stored in any way which is suitable for the computer program product 130.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For examples, although using LTE specific terminology, the herein disclosed embodiments may also be applicable to communications networks not based on LTE, mutatis mutandis.

What is claimed is:

1. A wireless device for transmitting a signal using a beamforming antenna array, the wireless device comprising:
   processing circuitry;
   memory containing instructions executable by the processing circuitry whereby the wireless device is operative to:
      obtain an indication for transmission of the signal requiring use of less than all of the physical antenna elements of the antenna array for transmission of the signal;
      reducing the full antenna aperture of the antenna array by forming virtual antenna elements for the less than all of the physical antenna elements of the antenna array
      connecting each of the virtual antenna elements to at least part of all physical antenna elements of the antenna array such that the virtual antenna elements at least partly utilize the full antenna aperture; and
      initiate transmission of the signal using the array of the virtual antenna elements.

2. The wireless device of claim 1, wherein the virtual antenna elements form a virtual antenna array being a subset of the full antenna array with respect to power patterns.

3. The wireless device of claim 1 wherein power amplifiers of the beamforming antenna array are fully utilized.

4. The wireless device of claim 1 wherein the beamforming antenna array has an antenna architecture based on one-dimensional or two-dimensional antenna arrays.

5. A network node for transmitting a signal using a beamforming antenna array, the antenna array comprising physical antenna elements of a first polarization and physical antenna elements of a second polarization, and the signal requiring use of a partial antenna array of the antenna array, the partial antenna array requiring less than all of the physical antenna elements of the antenna array for transmission of the signal, the network node comprising:
   processing circuitry;
   memory containing instructions executable by the processing circuitry whereby the network node is operative to:
      form at least one virtual antenna element for the partial antenna array to create a virtual aperture smaller than the full antenna aperture of the antenna array;
      connect each of the at least one virtual antenna element to at least one physical antenna element of the first polarization and at least one physical antenna element of the second polarization such that the at least one virtual antenna element at least partly utilize the full antenna aperture; and
      transmit the signal using the physical antenna elements connected to the at least one virtual antenna element.

6. A network node of claim 5, wherein the first polarization is orthogonal to the second polarization.

7. The network node of claim 5, wherein connecting each of the at least one virtual antenna element comprises connecting each of the at least one virtual antenna element to at least one physical antenna element of the first polarization and at least one physical antenna element of the second polarization such that the at least one virtual antenna element utilize the full antenna aperture.

8. The network node of claim 5, wherein an angular power pattern of the at least one virtual antenna element is identical to an angular power pattern of one of the physical antenna elements of the antenna array.

9. The network node of claim 5, wherein the at least one virtual antenna element have a total power being the sum of output power for all physical antenna elements of the antenna array.

10. The network node of claim 5, wherein the at least one virtual antenna element are formed by reduction factors Q and R being applied to all antenna elements of the antenna array.

11. The network node of claim 10, wherein all non-zero elements of the reduction factors Q and R have constant modulus.

12. The network node of claim 10:
   wherein Q comprises:
      a first factor $O_{2A}$ for reduction along a first dimension and resulting in a first polarization of the at least one virtual antenna element; and
      a second factor $Q_{2B}$ for reduction along the first dimension and resulting in a second polarization of the at least one virtual antenna element;
   wherein R comprises:
      a first factor $R_{2A}$ for reduction along a second dimension and resulting in the first polarization of the at least one virtual antenna element; and
      a second factor $R_{2B}$ for reduction along the second dimension and resulting in the second polarization of the at least one virtual antenna element.

13. The network node of claim 12, wherein $Q_{2A}$ and $Q_{2B}$ have identical dimensions resulting in same reduction, and wherein $R_{2A}$ and $R_{2B}$ have identical dimensions resulting in same reduction.

14. The network node of claim 12, wherein reduction using $Q_{2A}$ and $Q_{2B}$ and reduction using $R_{2A}$ and $R_{2B}$ result in the at least one virtual antenna element having orthogonal polarization in all directions.

15. The network node of claim 12:
wherein elements of $Q_{2B}$ are derived from $Q_{2A}$ by reversing in order, negating, and/or complex conjugating the elements of $Q_{2A}$; and
wherein elements of $R_{2B}$ are derived from $R_{2A}$ by reversing in order, negating, and/or complex conjugating the elements of $R_{2A}$.

16. The network node of claim 5, wherein the at least one virtual antenna element for each polarization have a phase center separation identical to the phase center separation of the full antenna aperture.

17. The network node of claim 5, wherein the full antenna aperture of the antenna array is iteratively reduced at least two times along at least one dimension of the antenna array.

18. The network node of claim 5, wherein the connecting each of the at least one virtual antenna element comprises expanding weight factors applied to the physical antenna elements by:
determining weight factors for the physical antenna elements responsive to weights applied to the at least one virtual antenna element utilizing one or more reduction factors Q and R; and
applying the weight factors to the physical antenna elements connected to the at least one virtual antenna element.

19. The network node of claim 18:
wherein the at least one virtual antenna element are formed by reduction factors Q and R being applied to all physical antenna elements of the antenna array;
wherein the weight factors are expanded using the reduction factors Q and R.

20. The network node of claim 5, wherein the partial antenna aperture is used to form one or two beam ports.

21. The network node of claim 5, wherein the reducing and the expanding only are performed along one dimension of the antenna array.

22. The method of claim 5, wherein the antenna array is a two-dimensional antenna array, and wherein the reducing and the expanding are performed along both dimensions of the antenna array.

23. A method for transmitting a signal using a beamforming antenna array, the antenna array comprising physical antenna elements of a first polarization and physical antenna elements of a second polarization, and the signal requiring use of a partial antenna array of the antenna array, the partial antenna array requiring less than all of the physical antenna elements of the antenna array for transmission of the signal, the method being performed by a network node and comprising:
forming at least one virtual antenna element for the partial antenna array to create a virtual aperture smaller than the full antenna aperture of the antenna array;
connecting each of the at least one virtual antenna element to at least one physical antenna element of the first polarization and at least one physical antenna element of the second polarization such that the at least one virtual antenna element at least partly utilize the full antenna aperture; and
transmitting the signal using the physical antenna elements connected to the at least one virtual antenna element.

24. A method for transmitting a signal using a beamforming antenna array, the method being performed by a wireless device and comprising:
obtaining an indication for transmission of the signal requiring use of less than all of the physical antenna elements of the antenna array for transmission of the signal;
reducing the full antenna aperture of the antenna array by forming virtual antenna elements for the less than all of the physical antenna elements of the antenna array;
connecting each of the virtual antenna elements to at least part of all physical antenna elements of the antenna array such that the virtual antenna elements at least partly utilize the full antenna aperture; and
initiating transmission of the signal using the array of the virtual antenna elements.

25. A non-transitory computer readable recording medium storing a computer program product for transmitting a signal using a beamforming antenna array, the antenna array comprising physical antenna elements of a first polarization and physical antenna elements of a second polarization, and the signal requiring use of a partial antenna array of the antenna array, the partial antenna array requiring less than all of the physical antenna elements of the antenna array for transmission of the signal, the computer program product comprising software instructions which, when run on processing circuitry of a network node, causes the network node to:
form at least one virtual antenna element for the partial antenna array to create a virtual aperture smaller than the full antenna aperture of the antenna array;
connect each of the at least one virtual antenna element to at least one physical antenna element of the first polarization and at least one physical antenna element of the second polarization such that the at least one virtual antenna element at least partly utilize the full antenna aperture; and
transmit the signal using the physical antenna elements connected to the at least one virtual antenna element.

* * * * *

UNITED STATES PATENT AND TRADEMARK OFFICE
CERTIFICATE OF CORRECTION

PATENT NO. : 11,056,785 B2
APPLICATION NO. : 16/803545
DATED : July 6, 2021
INVENTOR(S) : Petersson et al.

It is certified that error appears in the above-identified patent and that said Letters Patent is hereby corrected as shown below:

In the Drawings

In Fig. 7, Sheet 5 of 6, delete Step "S110" and insert Step -- S108 --, therefor.

In Fig. 8, Sheet 5 of 6, and on the title page, the illustrative print figure, delete Step "S110" and insert Step -- S108 --, therefor.

In the Specification

In Column 1, Line 7, delete "2017," and insert -- 2017, now U.S. Pat. No. 10,581,165, --, therefor.

In Column 5, Line 51, delete "5(5)" and insert -- 5(b) --, therefor.

In Column 7, Line 50, delete "$Q=[Q_{2A}Q_{2B}]$," and insert -- $Q = [Q_{2A}\ Q_{2B}]$, --, therefor.

In Column 8, Line 13, delete "$R=[R_{2A}R_{2B}]$," and insert -- $R = [R_{2A}\ R_{2B}]$, --, therefor.

In Column 8, Line 29, delete "$u_2^T=[u_{2A}^T u_{2B}^T]$, where $u_{2A}^T$ and $u_{2B} \in C^{2\times 1}$" and insert -- $u_2^T=[u_{2A}^T\ u_{2B}^T]$, where $u_{2A}^T$ and $u_{2B}^T \in C^{2\times 1}$ --, therefor.

In Column 8, Line 32, delete "$u_{2A}^T=[e^{i\delta_1} 0]/\sqrt{2}$" and insert -- $u_{2A}^T=[e^{i\delta_1}\ 0]/\sqrt{2}$ --, therefor.

In Column 8, Line 34, delete "$u_{2A}^T=[e^{i\delta_1}0]/\sqrt{2}$" and insert -- $u_{2A}^T=[e^{i\delta_1}\ 0]/\sqrt{2}$ --, therefor.

In Column 9, Line 16, delete "matrices matrices" and insert -- matrices --, therefor.

In Column 9, Line 50, delete "$v_6^T=e^{i\delta_3}[u_{6B}^T F - u_{6A}^T F]^*$" and insert -- $v_6^T=e^{i\delta_3}[u_{6B}^T F - u_{6A}^T F]^*$ --, therefor.

Signed and Sealed this
Fourth Day of April, 2023

Katherine Kelly Vidal
*Director of the United States Patent and Trademark Office*

CERTIFICATE OF CORRECTION (continued)
U.S. Pat. No. 11,056,785 B2

In Column 10, Line 35, delete "can used" and insert -- can be used --, therefor.

In the Claims

In Column 13, Line 47, in Claim 1, delete "array" and insert -- array; --, therefor.

In Column 14, Line 19, in Claim 6, delete "A" and insert -- The --, therefor.

In Column 14, Line 46, in Claim 12, delete "$O_{2A}$" and insert -- $Q_{2A}$ --, therefor.

In Column 15, Line 38, in Claim 22, delete "method" and insert -- network node --, therefor.